(12) United States Patent
Montagne et al.

(10) Patent No.: US 9,887,512 B2
(45) Date of Patent: Feb. 6, 2018

(54) THICK DISC LASER AMPLIFICATION SYSTEM AND USES THEREOF

(71) Applicants: COMPAGNIE INDUSTRIELLE DES LASERS CILAS, Orleans (FR); AIRBUS DEFENCE AND SPACE SAS, Les Mureaux (FR)

(72) Inventors: Jean-Eucher Montagne, Orleans (FR); Sandrine Auroux, Orleans (FR); Bruno Esmiller, Villennes-sur-Seine (FR)

(73) Assignees: COMPAGNIE INDUSTRIELLE DES LASERS CILAS, Orleans (FR); AIRBUS DEFENCE AND SPACE SAS, Les Mureaux (FR)

(*) Notice: Subject to any disclaimer, the term of this patent is extended or adjusted under 35 U.S.C. 154(b) by 0 days.

(21) Appl. No.: 14/895,411

(22) PCT Filed: May 20, 2014

(86) PCT No.: PCT/FR2014/051167
§ 371 (c)(1),
(2) Date: Dec. 2, 2015

(87) PCT Pub. No.: WO2014/195595
PCT Pub. Date: Dec. 11, 2014

(65) Prior Publication Data
US 2016/0118764 A1    Apr. 28, 2016

(30) Foreign Application Priority Data
Jun. 4, 2013 (FR) .................................... 13 01266

(51) Int. Cl.
*H01S 3/07* (2006.01)
*H01S 3/04* (2006.01)
(Continued)

(52) U.S. Cl.
CPC .......... *H01S 3/2333* (2013.01); *H01S 3/0604* (2013.01); *H01S 3/09415* (2013.01);
(Continued)

(58) Field of Classification Search
CPC .... H01S 3/2333; H01S 3/1611; H01S 3/2316; H01S 3/0604; H01S 3/09415
See application file for complete search history.

(56) References Cited

U.S. PATENT DOCUMENTS

| | | | |
|---|---|---|---|
| 4,019,151 A * | 4/1977 | Brueckner | .............. H01S 3/083 359/337 |
| 5,148,441 A | 9/1992 | Itai | |

(Continued)

FOREIGN PATENT DOCUMENTS

| | | |
|---|---|---|
| DE | 195 41 020 A1 | 5/1997 |
| EP | 2 182 598 A2 | 5/2010 |
| WO | 2005/091447 A1 | 9/2005 |

OTHER PUBLICATIONS

Antognini, A., et al., "Thin-Disk Yb:YAG Oscillator-Amplifier Laser, ASE, and Effective Yb:YAG Lifetime," IEEE Journal of Quantum Electronics 45(8):993-1005, Aug. 1, 2009.

(Continued)

*Primary Examiner* — Yuanda Zhang
(74) *Attorney, Agent, or Firm* — Christensen O'Connor Johnson; John Denkenberger; Laura Cruz

(57) ABSTRACT

The invention concerns a laser amplification system comprising a pumping device and at least one thick amplifier disc having a first face, which is reflective at the wavelengths of a pulsed laser beam of the laser amplification system and of a pump beam of the pumping device, as well as at least one heat-dissipation component to which this first face of the amplifier disc is firmly secured, the saturation (Continued)

Figure 1:
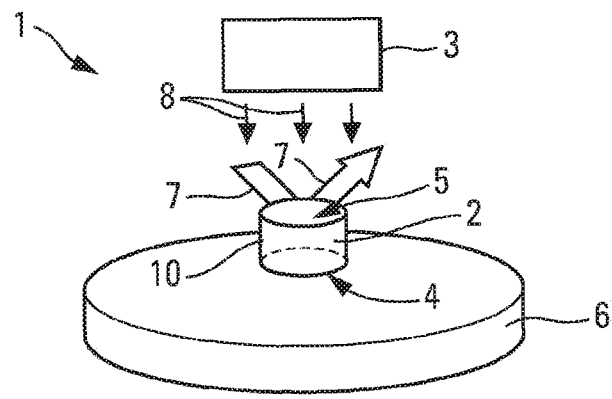

fluence of the active medium of the amplifier disc being equal to or less than 3 J·cm$^{-2}$.

12 Claims, 1 Drawing Sheet

(51) Int. Cl.
*H01S 3/23* (2006.01)
*H01S 3/0941* (2006.01)
*H01S 3/16* (2006.01)
*H01S 3/06* (2006.01)
*H01S 3/02* (2006.01)

(52) U.S. Cl.
CPC .......... *H01S 3/1611* (2013.01); *H01S 3/2316* (2013.01); *H01S 3/025* (2013.01)

(56) References Cited

U.S. PATENT DOCUMENTS

| | | |
|---|---|---|
| 6,118,804 A | 9/2000 | Altmann |
| 6,339,605 B1* | 1/2002 | Vetrovec ................ H01S 3/025 359/333 |
| 2004/0095975 A1 | 5/2004 | Bruesselbach |
| 2004/0233960 A1* | 11/2004 | Vetrovec ............... H01S 3/0604 372/67 |
| 2006/0182162 A1 | 8/2006 | Yanagisawa |
| 2007/0133646 A1* | 6/2007 | Dick ...................... H01S 3/025 372/92 |
| 2007/0297469 A1* | 12/2007 | Brown ................... H01S 3/042 372/34 |
| 2008/0175288 A1 | 7/2008 | Vetrovec |

OTHER PUBLICATIONS

Mukhin, I., et al., "One Kilohertz Cryogenic Disk Laser With High Average Power," Proc. of SPIE 8080(1), May 5, 2011, 13 pages.

International Search Report dated Oct. 9, 2014, issued in corresponding International Application No. PCT/FR2014/051167, filed May 20, 2014, 3 pages.

Written Opinion of the International Search Authority, issued in corresponding International Application No. PCT/FR2014/051167, filed May 20, 2014, 6 pages.

* cited by examiner

THICK DISC LASER AMPLIFICATION SYSTEM AND USES THEREOF

The present invention relates to a laser amplification system, and to uses of such a system, in particular an amplifier and an oscillator.

A laser amplification system comprises at least one active (or amplifier) element (or medium), with which a pumping device is associated. This amplifier element comprises a doped material that is capable of absorbing a pumping beam emitted by a pumping device for amplifying a laser beam.

The amplification system may comprise amplifier discs doped with ytterbium (Yb). By way of example, the following articles relating to pulsed-type Yb:YAG-disc lasers may be cited:

an article entitled: "14 J/2 Hz $Yb^{3+}$:YAG diode pumped solid state laser chain", by Thierry Gonçalvès-Novo, Daniel Albach, Bernard Vincent, Mikayel Arzakantsyan and Jean-Christophe Chanteloup, published in "OPTICS EXPRESS" vol. 21, no. 1, p. 855-866 (14 Jan. 2013);

an article entitled "Pulsed operation of a high average power Yb:YAG thin-disk multipass amplifier" by M. Schulz, R. Riedel, A. Willner, S. Düsterer, M. J. Prandolini, J. Feldhaus, B. Faatz, J. Rossbach, M. Drescher and F. Tavella, published in "OPTICS EXPRESS" vol. 20, no. 5, p. 5038-5043 (27 Feb. 2012); and an article entitled "Thin-Disk Yb:YAG Oscillator-Amplifier Laser, ASE, and Effective Yb:YAG Lifetime" by Antognini, A.; Schuhmann, K.; Amaro, F. D.; Biraben, F.; Dax, A.; Giesen, A.; Graf, T.; Hansch, T. W.; Indelicato, P.; Julien, L.; Cheng-Yang Kao; Knowles, P. E.; Kottmann, F.; Le Bigot, E.; Yi-Wei Liu; Ludhova, L.; Moschuring, N.; Mulhauser, F.; Nebel, T.; Nez, F.; Rabinowitz, P.; Schwob, C.; Taqqu, D. and Pohl, R, published in "IEEE Journal of Quantum Electronics" 45, p. 993-1005 (2009).

Such ytterbium-doped discs have a saturation density which is around 10 $J \cdot cm^{-2}$. In order to extract energy therefrom, two pulses cannot simultaneously overlap without the risk of damage to the flux resistance. Typically, the distance between two passes on one disc is greater than 1 meter in this case. The architecture obtained is therefore of a significant size.

The present invention relates to a laser amplification system which in particular makes it possible to overcome this drawback.

For this purpose, according to the invention, said laser amplification system, of the type comprising:
at least one amplifier disc and
at least one pumping device of the semiconductor type, preferably the diode semiconductor type, generating a pumping beam for said amplifier disc,
is distinctive in that:
the amplifier disc is a thick amplifier disc, and it has a first face which is reflective at the wavelengths both of a laser beam which is of the pulsed type and of a pumping beam of the pumping device,
said laser amplification system further comprises at least one heat dissipation element, to which the first face of said amplifier disc is rigidly connected, and
the saturation flux of the active medium of the amplifier disc is less than or equal to 3 $J \cdot cm^{-2}$.

Preferably, said laser amplification system comprises a plurality of amplifier discs. In addition, in a preferred embodiment, said amplifier disc(s) are doped with neodymium (Nd).

Owing to the above-mentioned features, the laser amplification system according to the invention has a saturation density which is significantly lower than in conventional cases of ytterbium doping (for example 0.7 $J \cdot cm^{-2}$ for Nd:YAG), and therefore allows the pulses of which the individual density is lower to overlap, and this makes it possible to install the discs in a manner that is ten to one hundred times more compact than in conventional systems, in a pulsed manner.

Preferably, said laser amplification system comprises a plurality of thick amplifier discs, which are:
either provided on the same heat dissipation element,
or distributed over a plurality of heat dissipation elements forming part of said laser amplification system.

The laser amplification system according to the invention is therefore based on the use of thick discs, which are preferably doped with neodymium and cooled. In the context of the present invention, a disc that is referred to as "thick" has a significant thickness (unlike a conventional amplifier disc referred to as "thin") that is in particular greater than 2 mm. In addition, preferably, the thickness of a thick disc is greater than 20% of the diameter relative to the shape of said amplifier disc, namely the diameter for an amplifier disc having a circular section, or the diameter of the circle surrounding and enclosing the amplifier disc in the case of a section of a different shape.

In contrast with the material doped with ytterbium, of which the increase in temperature significantly reduces the effectiveness, materials doped with neodymium allow effective operation at high temperatures (greater than 100° C.) owing to the four-level nature of these materials. In practice, this feature limits the use of the ytterbium-doped discs to thicknesses of approximately 100 µm. However, this property makes it possible to use neodymium-doped thick discs in high-power configurations. The thick discs have the benefit of allowing longitudinal gain (which is useful) of the same order of magnitude as the transverse gain (which itself produces parasitic effects). In this way, both the stored energy and the ability to extract said energy are greatly increased.

Therefore, by way of the invention, a laser amplification system is obtained which makes it possible to generate both high average power and a high level of energy.

Furthermore, said laser amplification system may have at least some of the following features, taken in isolation or in combination:
it is configured to generate a circulation of the laser beam which passes from an amplifier disc to another adjacent amplifier disc, by reflecting from a surface which both allows said laser beam to be reflected and allows said pumping beam to be transmitted;
it is configured to generate a double pass in each amplifier disc if it is used in an amplifier;
said pumping device is configured to generate homogeneous pumping, in particular in order to ensure good spatial quality of the beam output from the amplifier disc. It is considered that homogeneous pumping is such that the local value of the pumping rate does not stray, by 10% either way, from the average value, outside a peripheral region of the amplifier disc (this peripheral region is generally 15%, or 25%, of the total surface area);
said pumping device is configured to generate pumping over more than 80% of the surface area of a second face of each of the amplifier discs;
said system is configured so that the optical path of the laser beam between two amplifier discs is less than fifteen times the diameter of an amplifier disc;
each amplifier disc is provided with a peripheral region that is designed to absorb an amplified spontaneous emission;

each amplifier disc comprises a second face, of which the
surface area is greater than or equal to that of said first
face, and it has a peripheral shape which fits to the trace
of the laser beam; and the pulses of the pulsed-type laser beam temporarily overlap
in the amplifier discs.

The present invention also relates to an oscillator which comprises at least one laser amplification system as set out above.

It also relates to an amplifier which comprises at least one such laser amplification system.

The accompanying drawings will give a better understanding of how the invention can be implemented. In these drawings, identical reference numerals designate similar elements.

Figure 2:
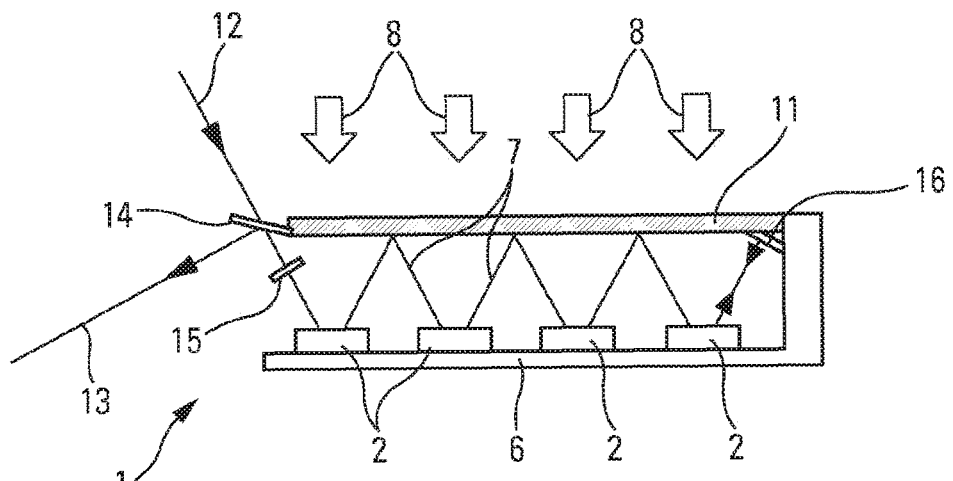
Figures 3A, 3B:
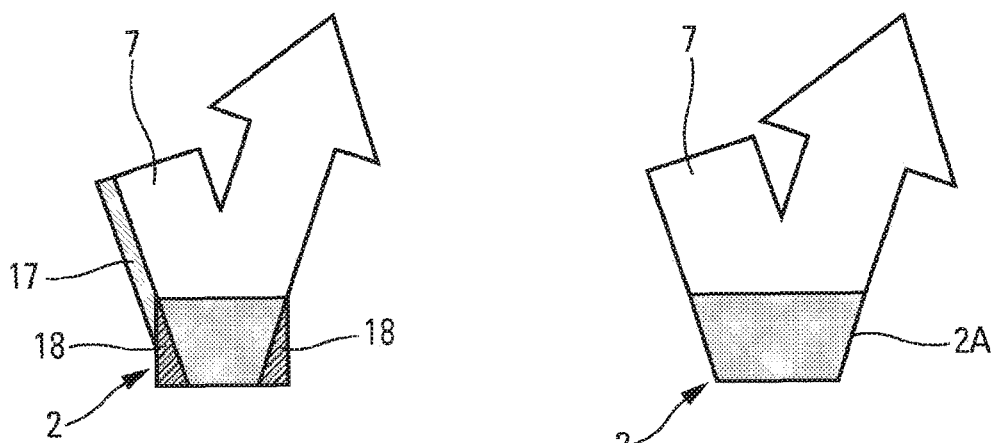

FIG. 1 schematically shows elements of a laser amplification system according to the invention;

FIG. 2 is a schematic example of a laser amplification system according to the invention; and FIGS. 3A and 3B are diagrams allowing the advantages of a conical amplifier disc to be illustrated.

The laser amplification system 1 according to the invention and shown schematically in FIG. 1 is intended to carry out laser amplification.

This laser amplification system 1 is of the type comprising:

at least one amplifier disc 2, and at least one pumping device 3 of the semiconductor type, preferably the diode semiconductor type, generating a pumping beam 8 for said amplifier disc(s) 2.

According to the invention:

each amplifier disc 2 is a thick amplifier disc, preferably doped with neodymium, and it has a first face 4 which is (highly) reflective at the wavelength of the laser beam 7 passing through the laser amplification system 1, which is of the pulsed type, and at that of the pumping beam 8 of the pumping device 3;

said laser amplification system 1 further comprises at least one heat dissipation element 6, to which the first face 4 of said amplifier disc 2 is rigidly connected; and the saturation flux of the active medium of the amplifier disc 2 is less than or equal to 3 J·cm$^{-2}$.

The system 1 according to the invention thus has a saturation density which is significantly lower (for example 0.7 J·cm$^{-2}$ for Nd:YAG) than in cases of ytterbium doping, and allows the pulses of which the individual density is lower to overlap, and this makes it possible to install the discs in a manner that is ten to one hundred times more compact than in conventional systems, in a pulsed manner.

Preferably, said laser amplification system 1 comprises a plurality of such thick amplifier discs 2, which are arranged:

either on the same heat dissipation element 6, or on a plurality of heat dissipation elements.

The amplifier disc(s) 2 of the laser amplification system 1 are cooled by one or more heat dissipation elements 6 so as to ensure good spatial quality of the amplified laser beam by said pumped amplifier disc(s) 2.

Each of said amplifier discs 2 is preferably doped with neodymium, and they also have a second face 5 (opposite said first face 4 and facing the pumping beam 8) which is provided with an antireflective treatment.

In the context of the present invention, an amplifier disc 2 that is referred to as "thick" has a significant thickness (unlike a conventional amplifier disc referred to as "thin") that is in particular greater than 2 mm. Preferably, the thickness of a thick amplifier disc 2 is greater than 20% of the diameter relative to said amplifier disc 2, namely the diameter for an amplifier disc having a circular section, or the diameter of the circle surrounding and enclosing the amplifier disc in the case of a section of a different shape.

In contrast with the material doped with ytterbium, of which the increase in temperature significantly reduces the effectiveness, materials doped with neodymium allow effective operation at high temperatures (greater than 100° C.), owing to the four-level nature of these materials. In practice, this feature limits the use of the ytterbium-doped discs to thicknesses of approximately 100 μm. However, this property makes it possible to use neodymium-doped thick amplifier discs 2 in high-power configurations. The thick amplifier discs 2 have the benefit of allowing longitudinal gain (which is useful) of the same order of magnitude as the transverse gain (which itself produces parasitic effects). In this way, both the stored energy and the ability to extract said energy are greatly increased. Therefore, the laser amplification system 1 according to the invention makes it possible to generate both high average power and a high level of energy.

The amplifier discs 2 of the system 1, which may be identical or different, are preferably conical or have a circular or elliptical section.

Since the reflective face 4 of each amplifier disc 2 is joined to a heat dissipation element 6, the amplifier disc 2 is cooled such that the temperature gradient in each amplifier disc 2 is approximately parallel to the direction of the laser beam 7 passing therethrough. In addition, the pulses of the pulsed-type laser beam 7 preferably temporarily overlap in the amplifier discs 2.

Moreover, in order to eliminate the negative effects of an amplified spontaneous emission (ASE) on the gain and therefore on the energy extracted from the amplifier discs 2, each amplifier disc 2 is provided with a peripheral region 10 which is designed to absorb the radiation at frequencies equal to that of an amplified spontaneous emission, and this allows these effects to be limited and therefore improves the output of the amplifier discs 2. In order to do this, said peripheral region 10 may comprise an absorbent layer.

Moreover, in particular to ensure good spatial quality of the beam output from an amplifier disc 2, said pumping device 3 is configured to generate homogeneous pumping. It is considered that homogeneous pumping is such that the local value of the pumping rate does not stray, by 10% either way, from the average value, outside a peripheral region of the amplifier disc 2 (this peripheral region is generally 15%, or 25%, of the total surface area of the face 5).

In addition, said pumping device 3 is configured to generate pumping over more than 80% of the surface area of the face 5 of each of said amplifier discs 2, and this induces a homogeneous heat load with low distortion.

Moreover, as shown in FIG. 2, the system 1 is configured to generate a circulation of the laser beam 7 which passes from an amplifier disc 2 to another adjacent amplifier disc 2, by reflecting from a surface 11 which both allows said laser beam 7 to be reflected and allows said pumping beam 8 to be transmitted. In addition, a particular embodiment has at least some of the following features:

said surface 11 comprises at least one dichroic mirror, which comprises antireflective regions and reflective regions. Preferably, said surface 11 comprises a single dichroic mirror which is shared by all the amplifier discs 2;

said amplifier discs 2 are all arranged in the same plane on a support which is shared by said amplifier discs 2 and comprises said heat dissipation element 6;

said system 1 is configured to generate a double pass per path in each amplifier disc 2; and said system 1 is configured so that the optical path of the laser beam 7 between two amplifier discs 2 is less than fifteen times the diameter of an amplifier disc 2.

This figure, FIG. 2, shows an example of a compact laser amplification system 1 which can be obtained by way of the invention. The number and the dimensions of the thick amplifier discs 2 depend on the level of energy to be reached. For example, four thick discs 2 having a diameter of 8 mm and a thickness of 4 mm allow 400 mJ to be reached from incident energy of 5 mJ. In addition, output energy of 10 J from incident energy of 400 mJ can be obtained from a laser amplification system comprising five thick discs 2 having a diameter of 35 mm and a thickness of 12 mm.

As shown in FIG. 2, the amplifier discs 2 are pumped from the top through the dichroic mirror 11. The incident beam 12 goes back and forth in the system 1 (by means of a highly reflective mirror 16), by zigzagging between the reflective faces of the amplifier discs 2 and the dichroic mirror 11 (laser beam 7), and leaves the system 1 in the form of an amplified beam 13. The dichroic mirror 11 is alternately doped with treatments that is highly reflective at the wavelength of the laser beam 7 and treatments which are not reflective at said wavelength.

The amplified beam 13 is extracted by the association of a polariser 14 and a quarter-wave plate 15. The quarter-wave plate 15 is used in double-pass operation. As a result, it is equivalent to a half-wave plate and makes it possible to change the direction of the polarisation. This plate 15 may be replaced by a Faraday rotator, the advantage of which is to compensate the birefringence of the discs.

In a preferred embodiment, the heat dissipation element 6 (to which all the amplifier discs 2 are fastened), the dichroic mirror 11, the highly reflective mirror 16 and the polariser 14 are rigidly connected, so as to ensure that the aim of the output beam 13 remains resilient when encountering environmental disturbances (vibrations).

In this configuration, the laser beam 7 is inclined relative to the normal to the discs 2. This inclination may be several degrees more than 10 degrees, and may cause diaphragmation of the signal beam if it has equal dimensions to the disc 2, as well as a limitation of the field of view of the beam in the disc as shown in FIG. 3A. This figure, FIG. 3A, shows a part 17 of the diaphragmated beam and pumped regions 18 of an amplifier disc 2 that are not used. One solution for maximising the overlap between the beam and the pumped region of the amplifier disc 2, while preventing diaphragmations, is to provide discs 2A of a conical shape (adapted to the properties of the beam 7), as shown in FIG. 3B. For the same reasons, the amplifier disc may also have an elliptical section, the large axis of the ellipse being in the zigzag plane of the amplified beam.

Therefore, each amplifier disc 2 preferably:
comprises an upper face 5, the surface area of which is greater than or equal to that of the lower face 4; and
has a peripheral shape which fits to the trace of the laser beam 7, such as the conical shape in FIG. 3B.

Owing to the above-mentioned features, a very compact system 1 can be obtained. By way of illustration, a system for amplifying 400 mJ may have the following dimensions: 80 mm in width and 60 mm in height.

The invention claimed is:

1. Laser amplification system, of the type comprising:
a plurality of amplifier discs, each of the amplifier discs having a first face which is reflective at wavelengths both of a laser beam and of a pumping beam, the saturation flux of an active medium of the amplifier discs being less than or equal to 3 $J \cdot c^{-2}$, wherein the amplifier discs are all arranged in a same plane on a support which is shared by the amplifier discs; and
at least one semiconductor-type pumping device, generating the pumping beam for the amplifier discs, wherein each of the amplifier discs is a thick amplifier disc;
the laser amplification system further comprises at least one heat dissipation element, to which the first face of the amplifier discs is rigidly connected; and
the laser amplification system is configured so that an optical path of a pulsed-type laser beam between two amplifier discs is less than fifteen times the diameter of an amplifier disc, wherein the system is configured to generate a circulation of the laser beam which passes from a first amplifier disc to a second adjacent amplifier disc by reflecting from a surface which both allows the laser beam to be reflected and allows the pumping beam to be transmitted, wherein the surface includes a single dichroic mirror which is shared by all the amplifier discs.

2. The system according to claim 1, wherein the system is configured to generate a double pass per optical path in each amplifier disc.

3. The system according to claim 1, wherein the pumping device is configured to generate pumping over more than 80% of the surface area of a second face of each amplifier disc.

4. The system according to claim 1, wherein each amplifier disc is doped with neodymium.

5. The system according to claim 1, wherein each amplifier disc is provided with a peripheral region that is designed to absorb an amplified spontaneous emission.

6. The system according to claim 1, wherein the saturation flux of the active medium of each amplifier disc is less than 1.5 $J \cdot cm^{-2}$.

7. The system according to claim 1, wherein the pumping device is configured to generate homogeneous pumping.

8. The system according to claim 1, wherein each amplifier disc comprises a second face, of which the surface area is greater than or equal to that of the first face, and it has a peripheral shape which fits to the trace of the laser beam.

9. The system according to claim 1, wherein pulses of the pulsed-type laser beam temporarily overlap in each amplifier disc.

10. A laser amplifier, comprising at least one laser amplification system such as that specified in claim 1.

11. A laser oscillator, comprising at least one laser amplification system such as that specified in claim 1.

12. The system according to claim 1, wherein the surface comprises at least one dichroic mirror facing the second face of the amplifier discs.

* * * * *